(12) United States Patent
Martin et al.

(10) Patent No.: US 8,740,739 B2
(45) Date of Patent: Jun. 3, 2014

(54) RECONFIGURABLE POWERSPLIT POWERTRAIN FOR AN ELECTRIC VEHICLE

(75) Inventors: Douglas R. Martin, Canton, MI (US); Ming L. Kuang, Canton, MI (US); Walt J. Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 13/198,062

(22) Filed: Aug. 4, 2011

(65) Prior Publication Data

US 2013/0035186 A1 Feb. 7, 2013

(51) Int. Cl.
*B60K 6/365* (2007.10)

(52) U.S. Cl.
USPC ............................ 475/5; 475/269; 180/65.265

(58) Field of Classification Search
None
See application file for complete search history.

(56) References Cited

U.S. PATENT DOCUMENTS

| | | | |
|---|---|---|---|
| 6,263,267 B1 * | 7/2001 | Anthony et al. | 701/22 |
| 7,175,555 B2 * | 2/2007 | Kozarekar et al. | 475/5 |
| 7,559,864 B2 * | 7/2009 | Maeda et al. | 475/5 |
| 7,694,762 B2 | 4/2010 | Supina et al. | |
| 7,712,560 B2 * | 5/2010 | Kozarekar | 180/65.21 |
| 8,122,983 B2 * | 2/2012 | Katsuta et al. | 180/65.225 |
| 2004/0121870 A1 * | 6/2004 | Takenaka et al. | 475/5 |
| 2006/0019784 A1 * | 1/2006 | Sowul et al. | 475/5 |
| 2006/0025265 A1 * | 2/2006 | Sowul et al. | 475/5 |
| 2006/0052199 A1 * | 3/2006 | Singh et al. | 475/5 |
| 2010/0029429 A1 * | 2/2010 | Ota | 475/5 |

* cited by examiner

*Primary Examiner* — David D Le
*Assistant Examiner* — Mark Manley
(74) *Attorney, Agent, or Firm* — David B. Kelley; MacMillan, Sobanski & Todd, LLC

(57) ABSTRACT

A powertrain includes a gearset including a sun gear, a carrier, a ring gear connected to a countershaft, pinions supported on the carrier and meshing with the sun gear and ring gear; a second gearset connectable to an engine, for overdriving a generator; a clutch for releasably connecting the engine and carrier; a second clutch for releasably connecting the sun gear and the generator; and a motor connected to a countershaft. Operation of the powertrain can be readily switched between powersplit mode and series mode.

15 Claims, 4 Drawing Sheets

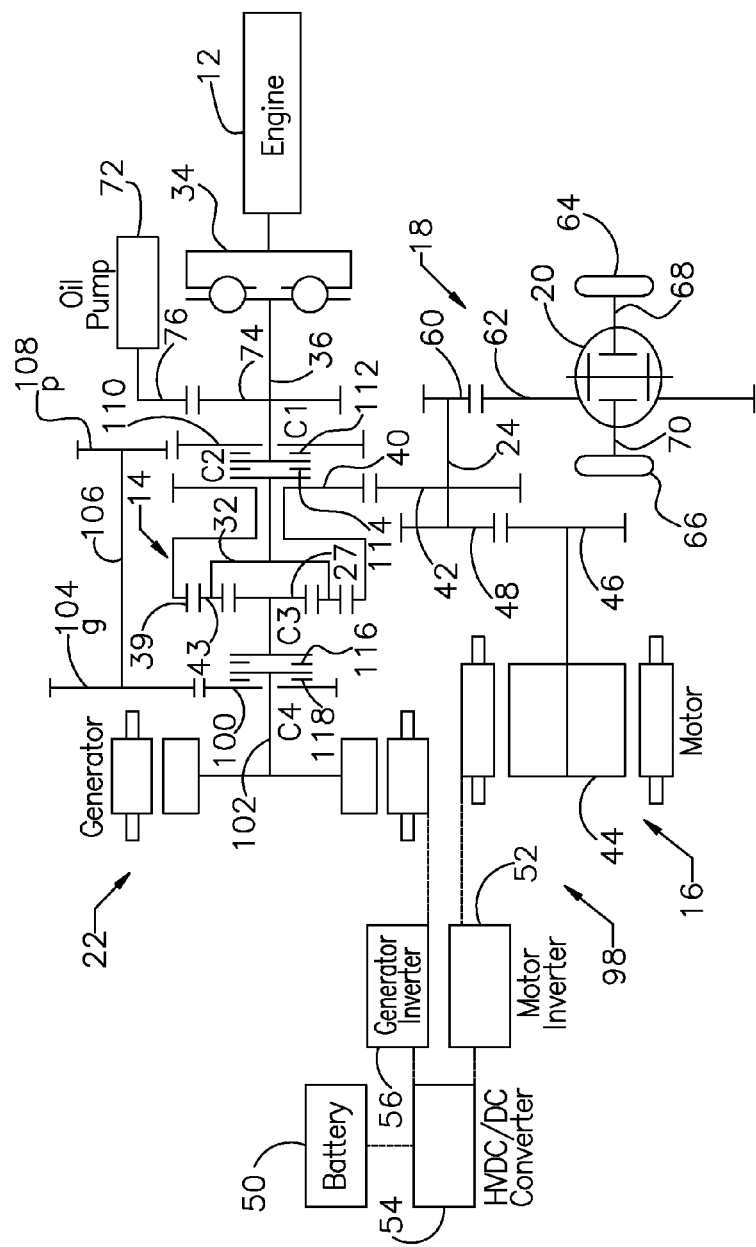

RECONFIGURABLE POWERSPLIT POWERTRAIN FOR AN ELECTRIC VEHICLE

BACKGROUND OF THE INVENTION

1. Field of the Invention

This invention relates generally to a powersplit powertrain for an electric vehicle.

2. Description of the Prior Art

The powertrain of a hybrid electric vehicle (HEV) includes an engine, electric motor/generator and traction battery, wherein the engine and motor can drive the wheels individually, the engine can charge the traction battery through the electric machine operating as a generator, and vehicle kinetic energy can be recovered and regenerated using the wheel brakes to drive the generator and recharge the battery.

In the powertrain for a plug-in hybrid (PHEV), the traction battery is significantly increased in capacity so that electrical energy from the electric grid can be used to drive the vehicle. As a result, a much greater use of electric drive is expected. The direct connection of the generator to the wheel speed causes the generator shaft to rotate as the vehicle moves when the engine is off. This causes several issues including (i) as the vehicle increases in speed, the generator speed gets excessively high causing a durability concern for the bearing, planetary gearset and generator; (ii) lowering of available torque needed to start the engine; (iii) since the generator is not being used, it generates an unnecessary spin loss; and (iv) in reverse gear with the engine running, the motor must react, thereby reducing the torque provided to the wheels.

SUMMARY OF THE INVENTION

A powertrain includes a gearset including a sun gear, a carrier, a ring gear connected to a countershaft, pinions supported on the carrier and meshing with the sun gear and ring gear; a second gearset connectable to an engine, for overdriving a generator; a clutch for releasably connecting the engine and carrier; a second clutch for releasably connecting the sun gear and the generator; and a motor connected to a countershaft.

The powertrain is reconfigurable in that operation of the powertrain can be readily switched from powershift mode to series mode and from series mode to powershift mode.

In a charge sustaining mode, the engine runs in either a series mode or a powersplit mode.

The powertrain provides full torque to the wheels from the traction motor, a benefit over a single mode powersplit powertrain.

The powertrain provides the high fuel economy and driveability of a powersplit powertrain with improved towing and vehicle launch capability.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 7 is a schematic diagram of a HEV powertrain; and

FIG. 8 is a chart showing the engaged and disengaged state of clutches that control the powertrain of FIG. 7.

DESCRIPTION OF THE PREFERRED EMBODIMENT

Figures 1, 2:
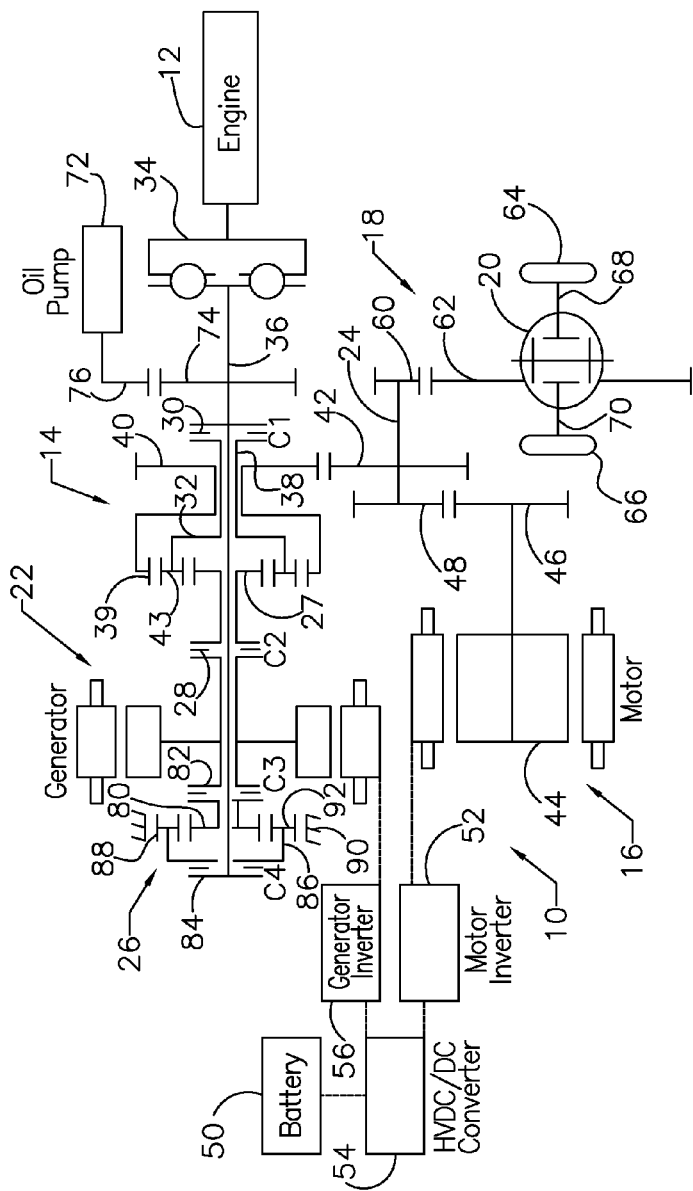
FIG. 1 is a schematic diagram of a HEV powertrain.
FIG. 2 is a chart showing the engaged and disengaged state of clutches that control the powertrain of FIG. 1.

Referring first to FIG. 1, a powertrain 10 includes a power source such as an internal combustion engine 12, such as a diesel engine or gasoline engine; a first planetary gearset 14; an electric motor 16; layshaft gearing 18; a differential mechanism 20; an electric generator 22; a countershaft 24, which is driveably connected to differential mechanism 20, output pinion 40 and motor 16; and a second planetary gearset 26. Each electric machine 16, 22 is a motor-generator, although conventionally electric machine 16 is referred to as a motor or traction motor, and electric machine 22 is referred to as a generator.

The sun gear 27 of the planetary gearset 14 is connected by clutch 28 to the generator 22. The carrier 32 of the planetary gearset 14 is connected by clutch 30 to the engine 12 through a torsion damper 34 and shaft 36. The ring gear 39 of gearset 14 is driveably connected to countershaft 24 by engaged output pinion 40 and gear 42, which form a layshaft gear pair 40-42. Planet pinions 43, supported on carrier 32, are in continual meshing engagement with ring gear 39 and sun gear 27.

The rotor 44 of motor 16 is connected to countershaft 24 through the gear pair 46-48.

Motor 16 is electrically connected to a traction battery 50 through an inverter 52 and a high voltage DC/DC converter 54. Similarly, generator 22 is electrically connected to battery 50 through an inverter 56 and converter 54.

Countershaft 24 is connected through a pinion 60 and ring gear 62 of the differential mechanism 20, which transmits power to the vehicle wheels 64, 66, through halfshafts or axle shafts 68, 70.

An oil pump 72 is driveably connected to shaft 36 and the engine output by a pinion 74 and gear 76.

The sun gear 80 of planetary gearset 26 is connected by clutch 82 to the generator 22. The carrier 86 of the planetary gearset 26 is connected by clutch 84 to the engine 12 through a torsion damper 34 and shaft 36. The ring gear 88 of gearset 26 is fixed against rotation due to its connection to case 90. Planet pinions 92, supported on carrier 86, are in continual meshing engagement with ring gear 88 and sun gear 80.

Powertrain 10 operates in powersplit mode when clutches 28, 30 are engaged and clutches 82, 84 are disengaged. Engine 12 is connected through clutch 30 to carrier 32, and the rotor of generator 22 is connected through clutch 28 to sun gear 27. In powersplit operation power produced by engine 12 and, if the battery 50 is supplying electric energy to generator, power produced by generator 22 is transmitted through gearset 14 and gear pair 40-42 to countershaft 24, and power produced by motor 16 is transmitted by gear pair 46-48 to countershaft 24. Final drive gear pair 60-62 transmits the power from engine 12, motor 16 and generator 22 to differential mechanism 20, which transmits power differentially to the vehicle wheels 64, 66, through shafts 68, 70. In powersplit operation with generator 22 operating as an electric generator, engine 12 supplies power to generator 22, thereby allowing the battery 50 to be recharged.

Powertrain 10 operates in series mode when clutches 28, 30 are disengaged and clutches 82, 84 engaged. Engine 12 is connected through clutch 84 to carrier 86 of gearset 26, sun gear 80 is overdriven relative to the speed of engine 12, and clutch 82 connects overdriven sun gear 80 to the rotor of generator 22. In series operation power produced by engine 12 drives generator 26 at a relatively high speed, thereby recharging battery 50, and power produced by motor 16 is transmitted by gear pair 46-48 to countershaft 24. Final drive gear pair 60-62 transmits the power produced by motor 16 to differential mechanism 20.

Figures 3, 4:
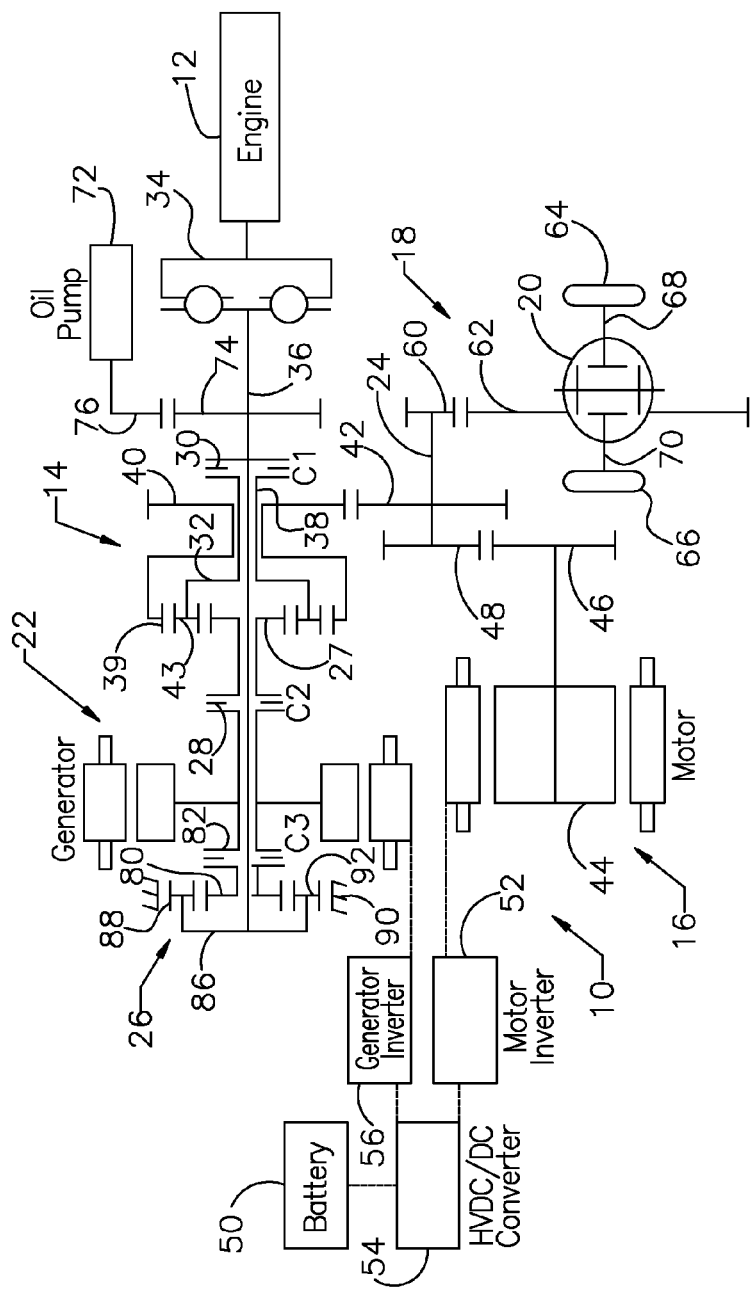
FIG. 3 is a schematic diagram of a HEV powertrain.
FIG. 4 is a chart showing the engaged and disengaged state of clutches that control the powertrain of FIG. 3.

In FIG. 3, clutch 84 is deleted, thereby directly, continually connecting carrier 86 of gearset 26 to engine 12 through shaft 36 and torsion damper 34. The powertrain 94 of FIG. 3 operates in powersplit mode when clutches 28, 30 are engaged and clutch 82 is disengaged. Engine 12 is connected through clutch 30 to carrier 32, and the rotor of generator 22 is connected through clutch 28 to sun gear 27. In powersplit operation, power produced by engine 12 and generator 26 is transmitted through gearset 14 and gear pair 40-42 to countershaft 24, and power produced by motor 16 is transmitted by gear pair 46-48 to countershaft 24. Final drive gear pair 60-62 transmits the power from engine 12, motor 16 and generator 22 to differential mechanism 20. In powersplit operation with generator 22 operating as an electric generator, engine 12 supplies power to generator 22, thereby allowing the battery 50 to be recharged.

The powertrain 94 of FIG. 3 operates in series mode when clutches 28, 30 are disengaged and clutch 82 is engaged. Engine 12 is connected directly to carrier 86 of gearset 26, sun gear 80 and the rotor of generator are overdriven relative to the speed of engine 12, and clutch 82 connects overdriven sun gear 80 to the rotor of generator 22. In series operation, power produced by engine 12 drives generator 22 at a relatively high speed, thereby recharging battery 50, and power produced by motor 16 is transmitted by gear pair 46-48 to countershaft 24. Final drive gear pair 60-62 transmits the power produced by motor 16 to differential mechanism 20.

Figures 5, 6:
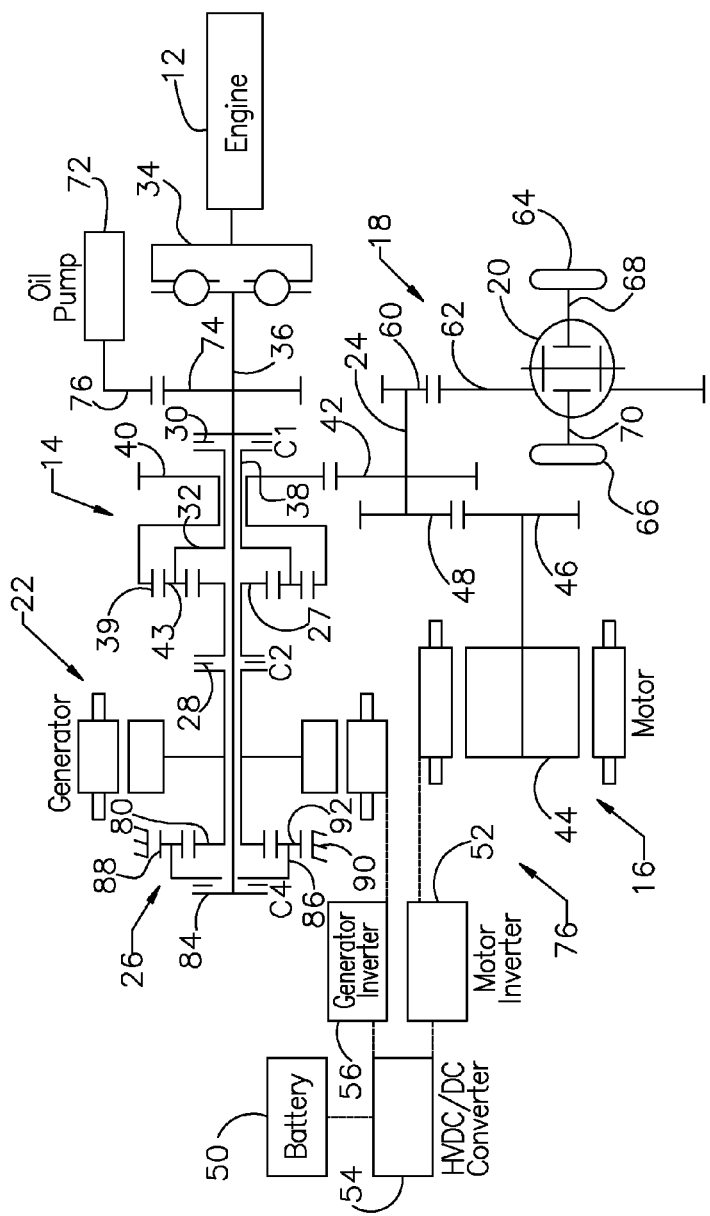
FIG. 5 is a schematic diagram of a HEV powertrain.
FIG. 6 is a chart showing the engaged and disengaged state of clutches that control the powertrain of FIG. 5.

In FIG. 5, clutch 84 is present, but clutch 82 is deleted, thereby directly, continually connecting sun gear 80 of gearset 26 to the rotor of generator 22. The powertrain 96 of FIG. 5 operates in powersplit mode when clutches 28, 30 are engaged and clutch 84 is disengaged. Engine 12 is connected through clutch 30 to carrier 32, and the rotor of generator 22 is connected through clutch 28 to sun gear 27. In powersplit operation, power produced by engine 12 and generator 26 is transmitted through gearset 14 and gear pair 40-42 to countershaft 24, and power produced by motor 16 is transmitted by gear pair 46-48 to countershaft 24. Final drive gear pair 60-62 transmits the power from engine 12, motor 16 and generator 22 to differential mechanism 20. In powersplit operation with generator 22 operating as an electric generator, engine 12 supplies power to generator 22, thereby allowing the battery 50 to be recharged.

The powertrain 96 of FIG. 5 operates in series mode when clutches 28, 30 are disengaged and clutch 84 is engaged. Engine 12 is connected through clutch 84 to carrier 86 of gearset 26, sun gear 80 is overdriven relative to the speed of engine 12 and connected directly to the rotor of generator 22. In series operation, power produced by engine 12 drives generator 26 at a relatively high speed, thereby recharging battery 50, and power produced by motor 16 is transmitted by gear pair 46-48 to countershaft 24. Final drive gear pair 60-62 transmits the power produced by motor 16 to differential mechanism 20.

Powertrain 98 of FIG. 7 includes a shaft 102, connected to the rotor of generator 22; a pinion 100, gear 104 meshing with pinion 102; a second countershaft 106 secure to gear 104 and to a pinion 108; a gear 110, meshing with pinion 108; a clutch 112 for opening and closing a drive connection between shaft 36 and gear 110; a clutch 114 for opening and closing a drive connection between shaft 36 and carrier 32 of gearset 14; a clutch 116 for opening and closing a drive connection between sun gear 27 and shaft 102; and a clutch 118 for opening and closing a drive connection between shaft 102 and pinion 100.

Powertrain 98 operates in powersplit mode when clutches 114, 116 are engaged and clutches 112, 118 are disengaged. Engine 12 is connected through clutch 112 to carrier 32, and the rotor of generator 22 is connected through clutch 116 to sun gear 27. In powersplit operation, power produced by engine 12 and, if the battery 50 is supplying electric energy to generator, power produced by generator 22 is transmitted through gearset 14 and gear pair 40-42 to countershaft 24, and power produced by motor 16 is transmitted by gear pair 46-48 to countershaft 24. Final drive gear pair 60-62 transmits the power from engine 12, motor 16 and generator 22 to differential mechanism 20, which transmits power differentially to the vehicle wheels 64, 66, through shafts 68, 70. In powersplit operation with generator 22 operating as an electric generator, engine 12 supplies power to generator 22, thereby allowing the battery 50 to be recharged.

Powertrain 10 operates in series mode when clutches 112, 118 are engaged and clutches 114, 116 are disengaged. Engine 12 is connected through clutch 112, gear 110, pinion 108, countershaft 106, gear 104, pinion 100 and shaft 102 to the rotor of generator 22, which is overdriven relative to the speed of engine 12. In series operation, power produced by engine 12 drives generator 22 at a relatively high speed, thereby recharging battery 50, and power produced by motor 16 is transmitted by gear pair 46-48 to countershaft 24. Final drive gear pair 60-62 transmits the power produced by motor 16 to differential mechanism 20.

In accordance with the provisions of the patent statutes, the preferred embodiment has been described. However, it should be noted that the alternate embodiments can be practiced otherwise than as specifically illustrated and described.

The invention claimed is:
1. A powertrain, comprising:
   a planetary gearset including an input, a second input, and an output connected to a countershaft;
   a second gearset including a pinion connected to a generator, a second countershaft, a gear meshing with the pinion and secured to the second countershaft, a second pinion secured to the second countershaft, and a second gear connected to the engine and meshing with the second pinion;
   a clutch connecting the input and an engine for equal speed rotation in forward drive;
   a second clutch connecting the second input and the generator;
   a motor connected to the countershaft.
2. The powertrain of claim 1, further comprising a differential for transmitting power between the countershaft and vehicle wheels.
3. The powertrain of claim 1, further comprising a first pair of meshing gears connecting the motor and the countershaft.

4. The powertrain of claim 3, further comprising a second pair of meshing gears connecting the output and the countershaft.

5. The powertrain of claim 4 further comprising a third pair of meshing gears connecting a differential and the countershaft.

6. The powertrain of claim 1, further comprising:
an electric storage battery;
a DC/DC converter electrically connected to the battery;
an inverter electrically connected to the motor and the converter; and
a second inverter electrically connected to the generator and the converter.

7. The powertrain of claim 1, further comprising:
a third clutch for releaseably connecting the engine and the second pinion; and
a fourth clutch for releaseably connecting the generator and the pinion.

8. A powertrain, comprising:
a gearset including a sun gear, a carrier, a ring gear connected to a countershaft, pinions supported on the carrier and meshing with the sun gear and ring gear;
a second gearset releasably connectable to an engine including a third pinion connected to the generator, a second countershaft, a gear meshing with the pinion and secured to the second countershaft, a fourth pinion secured to the second countershaft, and a second gear connected to the engine and meshing with the fourth pinion;
a clutch for releaseably connecting the engine and carrier;
a second clutch for releaseably connecting the sun gear and a generator;
a motor connected to the countershaft.

9. The powertrain of claim 8, further comprising a differential for transmitting power between the countershaft and vehicle wheels.

10. The powertrain of claim 8, further comprising a first pair of meshing gears connecting the motor and the countershaft.

11. The powertrain of claim 10, further comprising a second pair of meshing gears connecting the ring gear and the countershaft.

12. The powertrain of claim 11, further comprising a third pair of meshing gears connecting a differential and the countershaft.

13. The powertrain of claim 8, further comprising:
an electric storage battery;
a DC/DC converter electrically connected to the battery;
an inverter electrically connected to the motor and the converter; and
a second inverter electrically connected to the generator and the converter.

14. The powertrain of claim 8, further comprising:
a third clutch for releaseably connecting the engine and the second gear; and
a fourth clutch for releaseably connecting the generator and the third pinion.

15. A powertrain, comprising:
a gearset including a sun gear, a carrier, a ring gear connected to a countershaft, pinions supported on the carrier and meshing with the sun gear and ring gear;
a second simple planetary gearset connected to an engine, including an output overdriven relative to an engine speed;
a clutch for releaseably connecting the engine and carrier for equal speed rotation in forward drive;
a second clutch for releaseably connecting the sun gear and the generator;
a third clutch for releaseably connecting the generator and said overdriven output.

* * * * *